United States Patent
Kotato et al.

(10) Patent No.: US 6,929,885 B2
(45) Date of Patent: Aug. 16, 2005

(54) NON-AQUEOUS ELECTROLYTIC SECONDARY BATTERY

(75) Inventors: Minoru Kotato, Ibarakai (JP); Hitoshi Suzuki, Ibaraki (JP); Takahiro Yamamoto, Tokyo (JP); Akira Yajima, Tokyo (JP)

(73) Assignees: Mitsubishi Chemical Corporation, Tokyo (JP); A&T Battery Corporation, Tokyo (JP)

( * ) Notice: Subject to any disclaimer, the term of this patent is extended or adjusted under 35 U.S.C. 154(b) by 0 days.

(21) Appl. No.: 10/718,711

(22) Filed: Nov. 24, 2003

(65) Prior Publication Data

US 2004/0101763 A1 May 27, 2004

Related U.S. Application Data

(63) Continuation of application No. PCT/JP02/04944, filed on May 22, 2002.

(30) Foreign Application Priority Data

May 22, 2001 (JP) ........................................ 2001-152234

(51) Int. Cl.$^7$ ............................................. H01M 6/16
(52) U.S. Cl. ...................... 429/331; 429/330; 429/163; 429/231.1; 429/231.3
(58) Field of Search ................. 429/331, 329, 429/330, 163, 231.1, 231.3

(56) References Cited

U.S. PATENT DOCUMENTS 6,794,089 B2 * 9/2004 Sekino et al. ................ 429/331

2002/0192565 A1 * 12/2002 Ueda et al. .................. 429/331

FOREIGN PATENT DOCUMENTS

| JP | 2000-040526 | 2/2000 |
|---|---|---|
| JP | 2000-235868 | 8/2000 |
| JP | 2001-023684 | 1/2001 |
| JP | 2002-015771 | 1/2002 |
| JP | 2002-042865 | 2/2002 |
| JP | 2002-158035 | 5/2002 |
| JP | 2002-184462 | 6/2002 |
| JP | 2002-190316 | 7/2002 |

* cited by examiner

Primary Examiner—Laura Weiner
(74) Attorney, Agent, or Firm—Oblon, Spivak, McClelland, Maier & Neustadt, P.C.

(57) ABSTRACT

A non-aqueous secondary battery having an electrode group and a non-aqueous electrolytic solution, characterized in that: (1) the electrode group is contained in a casing made of a sheet having a resin layer with a thickness of 0.5 mm or less, (2) the non-aqueous solvent contains γ-butyrolactone, ethylene carbonate, at least one vinylene carbonate compound and at least one vinylethylene carbonate compound, (3) the amounts of the vinylene carbonate compound, the vinylethylene carbonate compound and sum total of both are, respectively, 0.01 to 5% by weight, 0.01 to 5% by weight and 0.02 to 6% by weight, based on the total weight of the non-aqueous solvent, and (4) the amounts of the γ-butyrolactone and the ethylene carbonate are, respectively, 50% by volume or more and 10% by volume or more, based on the total volume of the non-aqueous solvent.

13 Claims, 1 Drawing Sheet

NON-AQUEOUS ELECTROLYTIC SECONDARY BATTERY

This application is a continuation of PCT/JP02/04944, filed May 22, 2002.

FIELD OF THE INVENTION

The present invention relates to a non-aqueous electrolytic secondary battery and a non-aqueous electrolytic solution used in the same.

BACKGROUND ART

Currently, as non-aqueous electrolytic secondary batteries for use in portable apparatuses such as mobile phones, lithium ion secondary batteries have been commercialized. In these secondary batteries, there are used a lithium-transition metal complex oxide material such as lithium cobalt oxide as a positive electrode; a graphite material or a carbonaceous material as a negative electrode; a solution obtained by dissolving a lithium salt in an organic solvent as a non-aqueous electrolytic solution; and a porous film as a separator.

In recent years, as the portable apparatuses become thinner, it is desired that the batteries have a reduced thickness. For this purpose, the thickness of a casing for containing therein the positive electrode, negative electrode, separator and non-aqueous electrolytic solution must be reduced.

When the thickness of the casing for the battery is reduced, a phenomenon such as a gas generation in the battery or an elevation of the battery internal temperature directly causes an accident such as deformation of the battery, gas leakage or ignition. Therefore, for securing the safety of the battery, it is necessary to suppress the gas generation in the battery or the elevation of the battery internal temperature in extremely low level.

For meeting the demand, Japanese Prov. Patent Publication No. 235868/2000 proposes a non-aqueous electrolytic secondary battery which comprises a casing comprised of a sheet comprising a resin layer and having a thickness of 0.5 mm or less, and an electrolytic solution comprised of a non-aqueous solvent comprising more than 50 to 95% by volume of γ-butyrolactone, based on the total volume of the non-aqueous solvent. It is stated that the non-aqueous electrolytic secondary battery which comprises the non-aqueous electrolytic solution comprised of the non-aqueous solvent comprising more than 50 to 95% by volume of γ-butyrolactone based on the total volume of the non-aqueous solvent, and further comprising ethylene carbonate and vinylene carbonate is especially preferable.

When using the electrolytic solution disclosed in the above patent document, an effect of improving the discharge characteristics at a large current or the cycle characteristics can be obtained; however, inflation of the casing due to gas generation in the battery when stored at high temperatures is not satisfactorily prevented.

In addition, Japanese Prov. Patent Publication No. 40526/2000 proposes a non-aqueous electrolytic solution for secondary battery having excellent charge-discharge efficiency, which solution comprises a non-aqueous solvent comprising a cyclic carbonate such as a vinylethylene carbonate derivative, and an electrolyte. However, when using an electrolytic solution comprising γ-butyrolactone, the cycle characteristics are not satisfactory.

The present invention has been made with a view toward solving the above-mentioned problems, and an object of the present invention is to provide a non-aqueous electrolytic secondary battery which is advantageous in that gas generation in the battery when stored at high temperatures is suppressed to prevent the casing of the battery from inflating, but also in that both the discharge characteristics at a large current and the charge-discharge cycle characteristics are improved.

DISCLOSURE OF THE INVENTION

In the present invention, there is provided a non-aqueous electrolytic secondary battery comprising at least: an electrode group having a positive electrode, a negative electrode which contains a material being capable of storing and releasing lithium ions, and a separator disposed between the positive electrode and the negative electrode; and a non-aqueous electrolytic solution containing a non-aqueous solvent(s) and a lithium salt dissolved in the non-aqueous solvent, with which the electrode group is impregnated, wherein (1) the electrode group is contained in a casing made of a sheet having a resin layer with a thickness of 0.5 mm or less, (2) the non-aqueous solvent contains γ-butyrolactone, ethylene carbonate, at least one vinylene carbonate compound represented by the formula (I):

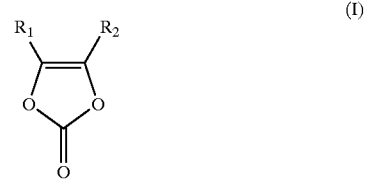

wherein $R_1$ and $R_2$ each independently represent a hydrogen atom or an alkyl group having 1 to 4 carbon atoms, and at least one vinylethylene carbonate compound represented by the formula (II):

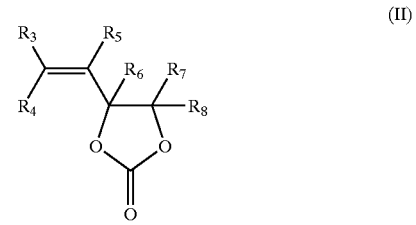

wherein $R_3$, $R_4$ and $R_5$ each independently represent a hydrogen atom or an alkyl group having 1 to 4 carbon atoms, and $R_6$, $R_7$ and $R_8$ each independently represent a hydrogen atom, an alkyl group having 1 to 4 carbon atoms or an alkenyl group having 2 to 7 carbon atoms, (3) the amount of the vinylene carbonate compound is 0.01 to 5% by weight based on the total weight of the non-aqueous solvent, the amount of the vinylethylene carbonate compound is 0.01 to 5% by weight based on the total weight of the non-aqueous solvent and the total amount of the vinylene carbonate compound and the vinylethylene carbonate compound is 0.02 to 6% by weight based on the total weight of the non-aqueous solvent, and (4) the amount of the γ-butyrolactone is 50% by volume or more and the amount of the ethylene carbonate is 10% by volume or more based on the total volume of the non-aqueous solvent.

Further, in the present invention, there is provided a non-aqueous electrolytic solution for a secondary battery, where the secondary battery has at least: an electrode group having a positive electrode, a negative electrode which contains a material being capable of storing and releasing lithium ions, and a separator disposed between the positive electrode and the negative electrode, wherein the electrode group is contained in a casing made of a sheet having a resin layer with a thickness of 0.5 mm or less; and a non-aqueous electrolytic solution containing a non-aqueous solvent(s) and a lithium salt dissolved in the non-aqueous solvent, with which the electrode group is impregnated, wherein (1) the non-aqueous solvent contains γ-butyrolactone, ethylene carbonate, at least one vinylene carbonate compound represented by the formula (I):

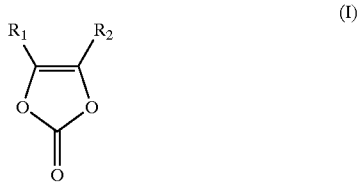

wherein $R_1$ and $R_2$ are the same as defined above,
and at least one vinylethylene carbonate compound represented by the formula (II):

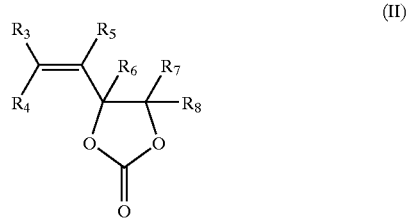

wherein $R_3$, $R_4$, $R_5$, $R_6$, $R_7$ and $R_8$ are the same as defined above, (2) the amount of the vinylene carbonate compound is 0.01 to 5% by weight based on the total weight of the non-aqueous solvent, the amount of the vinylethylene carbonate compound is 0.01 to 5% by weight based on the total weight of the non-aqueous solvent, and the total amount of the vinylene carbonate compound and the vinylethylene carbonate compound is 0.02 to 6% by weight based on the total weight of the non-aqueous solvent, and (3) the amount of the γ-butyrolactone is 50% by volume or more based on the total volume of the non-aqueous solvent and the amount of the ethylene carbonate is 10% by volume or more, based on the total volume of the non-aqueous solvent.

BEST MODE FOR CARRYING OUT THE INVENTION

The non-aqueous electrolytic secondary battery of the present invention will be described in detail with reference to FIGS. 1 and 2.

Figure 1:
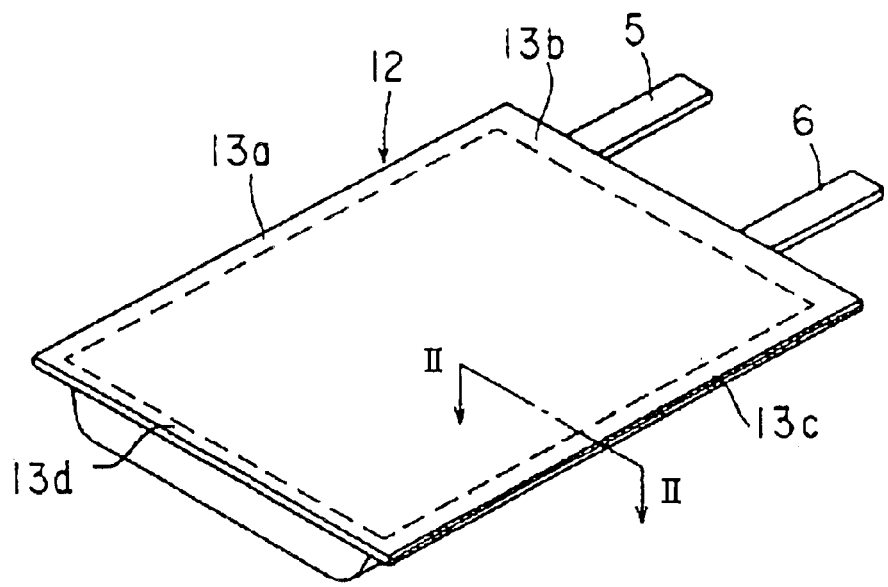
FIG. 1 is a perspective view of one example of a non-aqueous electrolytic secondary-battery of the present invention.
Figure 2:
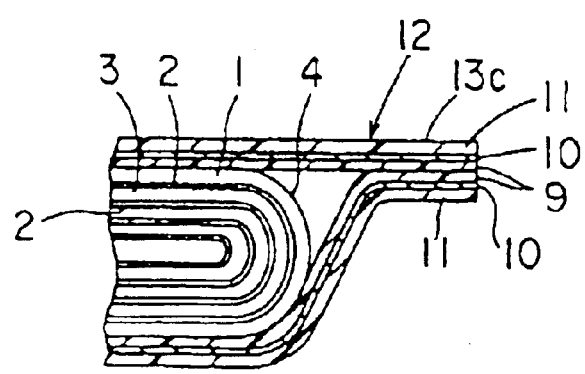
FIG. 2 is a cross-sectional view of FIG. 1, taken along line II—II.

As shown in FIGS. 1 and 2, electrode group 4 is an electrode group that positive electrode 1 containing an active material, negative electrode 3 containing an active material, and separator 2 disposed between them are spirally wound and flattened into a rectangular form. External terminal 5 connected to positive electrode 1 and external terminal 6 connected to negative electrode 3 extend outward from the same side of electrode group 4. The form of the electrode group is not limited to the form obtained by spirally winding and flattening the positive electrode and other components as mentioned above but may be a form obtained by laminating the positive electrode, the separator, and the negative electrode.

Casing film 12 which constitutes a casing is shaped into a cup form, and has a structure such that sealant film 9, gas barrier film 10 and organic resin film 11 having stiffness are laminated in this order from the inside to the outside of the cup. The cup of casing film 12 contains therein electrode group 4 which is flattened into a rectangular form, and an electrolytic solution. In casing film 12, bent portion 13d is positioned on the side opposite to external terminals 5 and 6 extending from electrode group 4, and the three sides of the cup other than the bent portion have seal portions 13a, 13b and 13c which horizontally extend and have heat-sealed sealant film 9. External terminals 5 and 6 extend outward from electrode group 4 through seal portion 13b on the side opposite to the bent portion.

Next, positive electrode 1, separator 2, negative electrode 3, a non-aqueous electrolytic solution and casing film 12 which constitutes a casing are described below in detail.

Positive electrode 1 has a structure such that a current collector has carried on one surface or both surfaces thereof a positive electrode layer containing an active material and a binder.

Examples of the current collector may include a sheet or mesh of aluminum, nickel or stainless steel.

Examples of the active material may include various oxides such as manganese dioxide, lithium manganese complex oxide, lithium nickel complex oxide, lithium cobalt complex oxide, lithium nickel cobalt complex oxide, lithium iron complex oxide and lithium vanadium complex oxide; chalcogen compounds such as titanium disulfide and molybdenum disulfide. From the viewpoint of obtaining a high voltage, especially preferred are lithium cobalt oxide ($LiCoO_2$), lithium nickel oxide ($LiNiO_2$) and lithium manganese complex oxides ($LiMn_2O_4$, $LiMnO_2$).

The binder has a function of holding the active materials on the current collector and bonding the active materials together, and examples may include polytetrafluoroethylene (PTFE), polyvinylidene fluoride (PVDF), ethylene-propylene-diene copolymers (EPDM) and styrene-butadiene rubbers (SBR).

The positive electrode layer may comprise a conductive material such as acetylene black, carbon black or graphite.

In the positive electrode layer, it is preferred that, for example, the amount of the active material, the amount of the binder, and the amount of the conductive material are, respectively, 80 to 95% by weight, 2 to 7% by weight, and 3 to 18% by weight, based on the total weight of these materials.

In positive electrode 1, the positive electrode layer on one surface of the current collector generally has a thickness of 10 to 150 μm. It is preferred that the current collector has a thickness of 5 to 20 μm. Further, it is preferred that the positive electrode layer coated on one surface (carried on one surface) has a thickness 3 to 6 times that of the current collector. Thus, not only can the strength of the positive electrode layer be secured, but also reduction in the weight can be achieved.

As separator 2, a porous separator can be used. As a material for the porous separator, a microporous film comprised of polyethylene, polypropylene, an ethylene-propylene copolymer, or an ethylene-butene copolymer; or woven fabric, nonwoven fabric containing fibers of these materials can be used.

Separator 2 preferably has a thickness in the range of from 5 to 30 μm, more preferably 10 to 25 μm. When the thickness of the separator falls in the above range, there is no fear that the internal resistance increases due to too large a distance between the positive and negative electrodes, and further a separator strength enough to prevent an occurrence of internal short-circuit can be secured.

The separator preferably has a porosity in the range of from 30 to 60%, more preferably 35 to 50%. When the porosity of the separator falls in the above range, excellent electrolytic solution holding properties can be obtained, and further a satisfactory separator strength can be secured.

It is preferred that the separator has an air permeability in the range of from 30 to 500 sec/100 cm³. When the air permeability of the separator falls in the above range, a high lithium ion mobility in the separator can be achieved, and further a satisfactory separator strength can be secured.

It is preferred that the separator has a degree of heat shrinkage of 20% or less, as measured after heat-treated at 120° C. for one hour.

Negative electrode 3 has a structure such that a current collector has carried on one surface or both surfaces thereof a negative electrode layer containing an active material and a binder.

Example of the current collector may include a copper sheet and copper mesh.

As to the active material, there is no particular limitation as long as it is capable of storing and releasing lithium ions. Examples of the active material may include metallic lithium, lithium alloys; carbonaceous materials which reversibly store and release lithium ions or intercalate and deintercalate lithium ions when charging and discharging the battery, such as coke, carbon fiber, graphite, mesophase pitch carbon, pyrolytic gaseous phase carbon materials and resin calcined products.

Examples of the binder may include polytetrafluoroethylene (PTFE), polyvinylidene fluoride (PVDF), ethylene-propylene-diene copolymers (EPDM), styrene-butadiene rubbers (SBR), and carboxymethyl cellulose (CMC).

In the negative electrode layer, for example, the amount of the active material and the amount of the binder may be, respectively, 90 to 99% by weight and 1 to 10% by weight, based on the total weight of these materials, and, if desired, the negative electrode layer may contain a conductive material.

In negative electrode 3, the negative electrode layer on one surface of the current collector generally has a thickness of 10 to 150 μm. It is preferred that the current collector has a thickness of 5 to 20 μm. Further, it is preferred that the negative electrode layer coated on one surface (carried on one surface) has a thickness 3 to 6 times that of the current collector. Thus, not only can the strength of the negative electrode layer be secured, but also reduction in the weight of the battery can be achieved.

The non-aqueous electrolytic solution comprises γ-butyrolactone, ethylene carbonate, a vinylene carbonate compound represented by the formula (I):

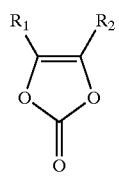

(I)

wherein $R_1$ and $R_2$ each independently represent a hydrogen atom or an alkyl group having 1 to 4 carbon atoms, and a vinylethylene carbonate compound represented by the formula (II):

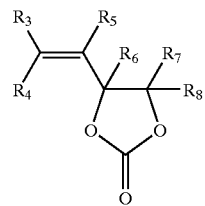

(II)

wherein $R_3$, $R_4$ and $R_5$ each independently represent a hydrogen atom or an alkyl group having 1 to 4 carbon atoms, and $R_6$, $R_7$ and $R_8$ each independently represent a hydrogen atom, an alkyl group having 1 to 4 carbon atoms or an alkenyl group having 2 to 7 carbon atoms, wherein the amount of the vinylene carbonate compound is 0.01 to 5% by weight based on the total weight of the non-aqueous solvent, the amount of the vinylethylene carbonate compound is 0.01 to 5% by weight based on the total weight of the non-aqueous solvent, and the total amount of the vinylene carbonate compound and the vinylethylene carbonate compound is 0.02 to 6% by weight, based on the total weight of the non-aqueous solvent, and wherein the amount of the γ-butyrolactone is 50% by volume or more based on the total volume of the non-aqueous solvent and the amount of the ethylene carbonate is 10% by volume or more based on the total volume of the non-aqueous solvent. The non-aqueous solvent used in the present invention comprises at least the above-mentioned four types of solvents in respectively predetermined amounts, and the sum of these solvents constitutes 100% by volume or 100% by weight, but the four types of solvents can contain 20% by volume or less of the below-described low viscosity solvent as a remainder non-aqueous solvent.

When the non-aqueous solvent has the above-mentioned composition, a gas generation in the battery when stored at high temperatures is suppressed to prevent the casing of the battery from inflating, and further both the discharge characteristics at a large current and the charge-discharge cycle characteristics can be improved.

In the vinylene carbonate compound represented by the formula (I), $R_1$ and $R_2$ each independently represent a hydrogen atom or an alkyl group having 1 to 4 carbon atoms. Examples of the alkyl group having 1 to 4 carbon atoms for $R_1$ and $R_2$ may include a methyl group, an ethyl group, a n-propyl group, an i-propyl group, a n-butyl group, a sec-butyl group and a tert-butyl group. Of these, especially preferred are a methyl group and an ethyl group.

Examples of the vinylene carbonate compound represented by the formula (I) may include vinylene carbonate, methylvinylene carbonate, ethylvinylene carbonate, 4,5-dimethylvinylene carbonate and 4,5-diethylvinylene carbonate. Of these, preferred are vinylene carbonate and 4,5-dimethylvinylene carbonate, and especially preferred is vinylene carbonate. These vinylene carbonate compounds can be used individually or admixture of two or more.

The amount of the vinylene carbonate compound is 0.01 to 5% by weight, especially preferably 0.1 to 3% by weight, based on the weight of the non-aqueous solvent.

In the vinylethylene carbonate compound represented by the formula (II), $R_3$, $R_4$ and $R_5$ each independently represent a hydrogen atom or an alkyl group having 1 to 4 carbon atoms, and $R_6$, $R_7$ and $R_8$ each independently represent a hydrogen atom, an alkyl group having 1 to 4 carbon atoms or an alkenyl group having 2 to 7 carbon atoms. When $R_3$, $R_4$, $R_5$, $R_6$, $R_7$ or $R_8$ is an alkyl group having 1 to 4 carbon atoms, there may be mentioned a methyl group, an ethyl group, a n-propyl group, an i-propyl group, a n-butyl group, a sec-butyl group and a tert-butyl group, and a methyl group or an ethyl group is particularly preferred. When $R_6$, $R_7$ or $R_8$ is an alkenyl group having 2 to 7 carbon atoms, there may be mentioned a vinyl group, a 1-methylvinyl group, a 2-methylvinyl group, a propenyl group, a 1-methylpropenyl group, a 2-methylpropenyl group, a 3-methylpropenyl group and a butenyl group.

Examples of the vinylethylene carbonate compound represented by the formula (II) may include 4-vinylethylene carbonate, 4-methyl-4-vinylethylene carbonate, 4-ethyl-4-vinylethylene carbonate, 4-n-propyl-4-vinylethylene carbonate, 5-methyl-4-vinylethylene carbonate, 4,4-divinylethylene carbonate and 4,5-divinylethylene carbonate. Of these, preferred are 4-vinylethylene carbonate, 4-methyl-4-vinylethylene carbonate and 4,5-divinylethylene carbonate, and especially preferred is 4-vinylethylene carbonate. These vinylethylene carbonate compounds can be used individually or admixture of two or more.

The amount of the vinylethylene carbonate compound is 0.01 to 5% by weight, especially preferably 0.1 to 3% by weight, based on the total weight of the non-aqueous solvent.

Further, the total amount of the vinylene carbonate compound and the vinylethylene carbonate compound is in the range of 0.02 to 6% by weight, especially preferably 0.2 to 5% by weight, based on the total weight of the non-aqueous solvent. It is considered that, when the total amount of the vinylene carbonate compound and the vinylethylene carbonate compound falls in the above range, a composite film derived from the vinylene carbonate compound and the vinylethylene carbonate compound is formed on the surface of the negative electrode at the initial stage in charging and it is presumed that this composite film is relatively stable at high temperatures, thus suppressing a gas generation in the battery when stored at high temperatures and improving both the charge-discharge cycle characteristics and the discharge characteristics at a large current.

In the non-aqueous solvent, the compositional ratio of the γ-butyrolactone is 50% by volume or more based on the total volume of the mixed non-aqueous solvent. When the compositional ratio of the γ-butyrolactone is less than 50% by volume, a gas is likely to generate at high temperatures. The amount of the γ-butyrolactone is more preferably in the range of from 60 to 85% by volume, further preferably 65 to 85% by volume.

In the non-aqueous solvent, the compositional ratio of the ethylene carbonate is 10% by volume or more based on the total volume of the mixed non-aqueous solvent. When the compositional ratio of the ethylene carbonate is 10% by volume or more, the charge-discharge efficiency of the negative electrode is improved, and both the charge-discharge cycle characteristics and the discharge characteristics at a large current can be remarkably improved.

From the viewpoint of improving the charge-discharge cycle characteristics, it is desired that a solvent comprising at least one compound selected from the group consisting of propylene carbonate, trifluoropropylene carbonate, diethyl carbonate, methylethyl carbonate and an aromatic compound is mixed into the electrolytic solution.

As the additional solvent to be mixed with the electrolytic solution, a low viscosity solvent can be mixed in an amount of 20% by volume or less based on the total volume of the non-aqueous solvent from the viewpoint of lowering the viscosity of solvents. Examples of the low viscosity solvent may include linear carbonates such as dimethyl carbonate, diethyl carbonate and ethylmethyl carbonate; linear ethers such as dimethoxyethane; and cyclic ethers such as tetrahydrofuran.

Examples of the electrolyte contained in the non-aqueous electrolytic solution may include lithium salts (electrolytes) such as lithium perchlorate ($LiClO_4$), lithium hexafluorophosphate ($LiPF_6$), lithium tetrafluoroborate ($LiBF_4$), lithium hexafluoroarsenate ($LiAsO_6$), lithium trifluorometasulfonate ($LiCF_3SO_3$) and lithium bistrifluoromethylsulfonylimide [$LiN(CF_3SO_2)_2$]. Of these, preferably used are $LiPF_6$ and $LiBF_4$.

It is desired that the amount of the electrolyte dissolved in the non-aqueous solvent is 0.5 to 2.0 mol/liter.

For improving the wettability of the separator by the non-aqueous electrolytic solution, a surfactant such as trioctyl phosphate may be added in an amount of 0.1 to 1% by weight based on the total weight of the non-aqueous solvent.

As to the amount of the non-aqueous electrolytic solution used in the battery, there is no particular limitation, and the amount of the non-aqueous electrolytic solution is preferably in the range of from 0.2 to 0.6 g per unit battery capacity 100 mAh. When the amount of the non-aqueous electrolytic solution falls in the above range, a satisfactory ion conductive property between the positive electrode and the negative electrode can be kept, and there is no fear that too large an amount of the electrolytic solution makes it difficult to seal the casing made of a film. The preferred range of the amount of the non-aqueous electrolytic solution is from 0.25 to 0.55 g per unit battery capacity 100 mAh.

Casing film 12 which constitutes a casing contains therein electrode group 4 and the non-aqueous electrolytic solution. The thickness of casing film 12 is 0.5 mm or less, preferably 0.05 to 0.3 mm, more preferably 0.05 to 0.25 mm, especially preferably 0.05 to 0.15 mm. When the thickness of the casing film falls in the above range, the capacity per unit weight of the battery is not lowered, and further the casing film having flexibility is unlikely to suffer deformation or damage due to a gas generated from the electrode group or the non-aqueous electrolytic solution.

The material for casing film 12 is a sheet, and casing film 12 comprises sealant film 9, gas barrier film 10, and organic resin film 11 having stiffness.

As sealant film 9, for example, a polyethylene (PE) film, a polypropylene (PP) film, a polypropylene-polyethylene copolymer film, an ionomer film or an ethylene-vinyl acetate (EVA) film can be used. Especially, for strengthening the seal portion, preferred is a polypropylene film.

Gas barrier film 10 in casing film 12 prevents an external substance from entering, and examples include aluminum, stainless steel, iron, copper and nickel. Of these, preferred is an aluminum foil which is lightweight and has excellent moisture barrier properties. It is preferred that the aluminum foil has a thickness of, for example, 20 to 100 μm.

As organic resin film 11 which imparts stiffness to casing film 12, for example, a polyethylene terephthalate (PET) film or a nylon film can be used.

Next, one example of a method for producing the non-aqueous electrolytic secondary battery of the present invention is described below. The method for producing the non-aqueous electrolytic secondary battery of the present invention is not limited to the example described below.

First, a separator is disposed between a positive electrode and a negative electrode, and they are together spirally wound into a substantially cylindrical form, and then pressed, for example, under the conditions of a pressure at 10 to 30 kg/cm$^2$ (about 1 to 3 MPa) and at room temperature to prepare an electrode group having a structure in which the positive electrode, separator, negative electrode and separator are together spirally wound and shaped into a flattened form. When spirally winding, external terminals are connected to the positive and negative electrodes by, for example, welding.

Then, a material for casing film obtained by laminating a sealant film, a gas barrier film and an organic resin film having stiffness in this order is shaped into a cup form so that the sealant film becomes the inner wall to prepare a casing film. The above-prepared electrode group is contained in the cup of the casing film so that the external terminals of the positive and negative electrodes extend from the cup on the side of the casing film opposite to the bent portion of the casing film. Then, the casing film is bent so as to cover the electrode group and placed on the rim (sealant film) of the cup. Subsequently, the casing film bent over the cup of the casing film is heat-sealed together so that a predetermined unsealed portion remains to form seal portions.

Next, a non-aqueous electrolytic solution is placed through the unsealed portion of the casing film, and then the unsealed portion is sealed up by heat-sealing to produce a non-aqueous electrolytic secondary battery having the above-mentioned structure shown in FIGS. 1 and 2.

EXAMPLES

Hereinbelow, the present invention will be described in more detail with reference to the following Examples, which should not be construed as limiting the scope of the present invention.

Example 1

<Preparation of Casing Film>

A material for casing film obtained by laminating a propylene film (sealant film), an aluminum foil (gas barrier film) having a thickness of 40 μm and a nylon film (organic resin film having stiffness) in this order was shaped into a rectangular cup form so that the propylene film (sealant film) became the inner wall, and then cut out to a predetermined size to prepare a casing film (total thickness: 100 μm).

<Preparation of Positive Electrode>

89 Parts by weight of $LiCoO_2$ powder as an active material, 8 parts by weight of graphite powder as conductive filler and 3 parts by weight of a polyvinylidene fluoride resin as a binder were mixed with 25 parts by weight of N-methylpyrrolidone to prepare a paste. Then, the paste was applied to both surfaces of an aluminum foil (thickness: 15 μm) and dried, followed by pressing and slitting, to prepare a positive electrode in a reel form.

<Preparation of Negative Electrode>

100 Parts by weight of flake graphite carbon was mixed with an aqueous solution containing 2 parts by weight of the sum of carboxymethyl cellulose and styrene-butadiene crosslinked rubber latex particles to prepare a paste. The paste was applied to both surfaces (partially, applied to one surface) of a copper foil (thickness: 15 μm), and dried, followed by pressing and slitting to prepare a negative electrode in a reel form.

<Preparation of Non-Aqueous Electrolytic Solution>

To a mixed solvent of ethylene carbonate and γ-butyrolactone in a 1:2 volume ratio were added 1.2 mol/liter of lithium tetrafluoroborate ($LiBF_4$), and vinylene carbonate in an amount of 0.5% by weight based on the total weight of the mixed non-aqueous solvent and 4-vinylethylene carbonate in an amount of 0.5% by weight based on the total weight of the mixed non-aqueous solvent, and dissolved to prepare a non-aqueous electrolytic solution.

<Preparation of Electrode Group>

Microporous films (porosity: 50%) made of polyethylene were disposed between the positive and negative electrodes and on the positive electrode, and external lead terminals were connected to the positive and negative electrodes by ultrasonic welding, and then spirally wound by means of a winding machine to prepare 100 cylindrical products. Then, the cylindrical products were pressed under the conditions of a pressure at 1 to 3 MPa and at room temperature to prepare electrode groups in a flattened form.

<Assembly of Non-Aqueous Electrolytic Secondary Battery>

The electrode group in a flattened form was placed in the cup of the casing film so that the external terminals of the positive and negative electrodes extended from the cup on the side of the casing film opposite to the bent portion of the casing film. Then, the casing film was bent so as to cover the electrode group, and placed on the rim (sealant film) of the cup, and the casing film bent over the cup of the casing film was heat-sealed together so that a predetermined unsealed portion remained to form seal portions. Then, the resultant cup was dried in a vacuum oven at 85° C. for 12 hours to remove moisture therefrom.

The non-aqueous electrolytic solution was introduced through the unsealed portion of the casing film, and then the unsealed portion was sealed up by heat-sealing to produce 20 non-aqueous electrolytic secondary batteries each having the above-mentioned structure shown in FIGS. 1. and 2 in which electrode group 4 in a flattened form and the electrolytic solution were contained in the cup of casing film 12 obtained by laminating polypropylene film 9, aluminum foil 10 and nylon film 11 in this order and the cup of the casing film was sealed.

Example 2

20 Non-aqueous electrolytic secondary batteries were produced in accordance with the same procedure as in Example 1 except that, as a non-aqueous electrolytic solution, a solution prepared by dissolving in a mixed solvent of ethylene carbonate and γ-butyrolactone in a 1:3 volume ratio, 1.2 mol/liter of lithium tetrafluoroborate ($LiBF_4$), vinylene carbonate in an amount of 0.25% by weight based on the total weight of the mixed non-aqueous solvent and vinylethylene carbonate in an amount of 1.0% by weight based on the total weight of the mixed non-aqueous solvent, was used.

Comparative Example 1

20 Non-aqueous electrolytic secondary batteries were produced in accordance with the same procedure as in Example 1 except that, as a non-aqueous electrolytic solution, a solution prepared by dissolving in a mixed solvent of ethylene carbonate and γ-butyrolactone in a 1:2 volume ratio, 1.2 mol/liter of lithium tetrafluoroborate ($LiBF_4$) and vinylene carbonate in an amount of 1.2% by weight based on the total weight of the mixed non-aqueous solvent, was used.

Comparative Example 2

20 Non-aqueous electrolytic secondary batteries were produced in accordance with the same procedure as in Example 1 except that, as a non-aqueous electrolytic solution, a solution prepared by dissolving in a mixed solvent of ethylene carbonate and γ-butyrolactone in a 1:2 volume ratio, 1.2 mol/liter of lithium tetrafluoroborate ($LiBF_4$) and vinylethylene carbonate in an amount of 1.0% by weight based on the total weight of the mixed non-aqueous solvent, was used.

Comparative Example 3

20 Non-aqueous electrolytic secondary batteries were produced in accordance with the same procedure as in Example 1 except that, as a non-aqueous electrolytic solution, a solution prepared by dissolving 1.2 mol/liter of lithium tetrafluoroborate ($LiBF_4$) in a mixed solvent of ethylene carbonate and γ-butyrolactone in a 1:2 volume ratio was used.

With respect to the non-aqueous electrolytic secondary batteries produced in Examples 1 and 2, and Comparative Examples 1 to 3, the degree of inflation in the high temperature storage test, the discharge rate at a large current, and the charge-discharge cycle characteristics were evaluated. The individual average values thereof are shown in Table 1.

TABLE 1

|  | Composition of a non-aqueous Electrolytic solution | 1) degree of inflation after stored at 85° C. | 2) [(Discharge at 3 CmA)/ (Discharge at 0.5 CmA)] ×100 | 3) maintaining ratio after 500 cycles |
|---|---|---|---|---|
| Ex. 1 | EC/BL (1:2 volume ratio) Vinylene carbonate 0.5 wt. % Vinylethylene carbonate 0.5 wt. % | 1.5% | 93.2% | 89.3% |
| Ex. 2 | EC/BL (1:3 volume ratio) Vinylene carbonate 0.25 wt. % Vinylethylene carbonate 1.0 wt. % | 1.0% | 90.5% | 87.5% |
| Comp. ex 1 | EC/BL (1:2 volume ratio) Vinylene carbonate 1.2 wt. % | 8.8% | 93.5% | 88.5% |
| Comp. ex 2 | EC/BL (1:2 volume ratio) Vinylethylene carbonate 1.0 wt. % | 1.3% | 78.0% | 72.4% |
| Comp. ex 3 | EC/BL (1:2 volume ratio) | 2.2% | 77.3% | 63.6% |

EC: Ethylene carbonate
BL: γ -butyrolactone

Evaluation of the battery properties was conducted by the following method.

Deformation of the casing when stored at high temperatures was evaluated in terms of the degree of inflation after stored at 85° C. The degree of inflation of the battery after stored at 85° C. is the degree of inflation of the battery which is fully charged and stored at 85° C. for 24 hours {a value (%) obtained by dividing the inflation amount by the thickness of the battery before stored}, and the smaller the value is, the smaller the degree of deformation at high temperatures becomes.

The discharge characteristics at a large current were evaluated in terms of [(Discharge at 3 CmA)/(Discharge at 0.5 CmA)]×100 (%). The larger the value is, the more excellent the discharge characteristics at a large current are. The value 1 CmA indicates a current which can discharge a battery fully charged in one hour.

The charge-discharge cycle characteristics were evaluated in terms of a maintaining ratio after 500 cycles. The maintaining ratio after 500 cycles is a maintaining ratio (%) of the capacity after 500 charge-discharge cycles at 1 CmA to the initial capacity, and the larger the value is, the more excellent the charge-discharge cycle characteristics is.

As is apparent from Table 1, the batteries produced in Comparative Example 1 in which the non-aqueous solvent contains no vinylethylene carbonate markedly inflate in the high temperature storage test, as compared to the batteries produced in Examples 1 and 2. On the other hand, it is apparent that the batteries produced in Comparative Example 2 in which the non-aqueous solvent contains no vinylene carbonate and the batteries produced in Comparative Example 3 in which the non-aqueous solvent contains neither vinylene carbonate nor vinylethylene carbonate have poor discharge characteristics at a large current and poor charge-discharge cycle characteristics.

INDUSTRIAL APPLICABILITY

As mentioned above in detail, according to the present invention, there can be provided a non-aqueous electrolytic secondary battery which is advantageous not only in that deformation of the casing of the battery when stored at high temperatures is suppressed, but also in that both the discharge characteristics at a large current and the charge-discharge cycle characteristics are improved.

What is claimed is:

1. A non-aqueous electrolytic secondary battery comprising:

a casing comprising a sheet with a thickness of 0.5 mm or less which has a resin layer, an electrode group having:

a positive electrode, a negative electrode which contains a material capable of storing and releasing lithium ions, and a separator disposed between the positive electrode and the negative electrode; and a non-aqueous electrolytic solution containing at least one non-aqueous solvent and at least one lithium salt dissolved in said solvent which impregnates said electrode group;

at least 50% of the total volume of the non-aqueous solvent is γ-butyrolactone, at least 10% of the total volume of the non-aqueous solvent is ethylene carbonate, and wherein the non-aqueous solvent contains 0.01 to 5% by weight of at least one vinylene carbonate compound represented by the formula (I), 0.01 to 5% by weight of at least one vinylethylene carbonate compound represented by the formula (II), and the total amount of the vinylene carbonate compound and the vinylethylene carbonate compound is 0.02 to 6% by weight;

wherein formulas (I) and (II) are:

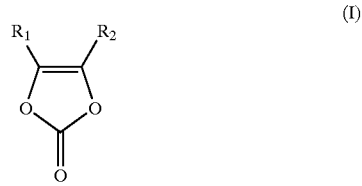

(I)

wherein $R_1$ and $R_2$ each independently represent a hydrogen atom or an alkyl group having 1 to 4 carbon atoms,

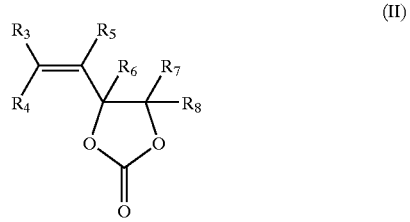

(II)

wherein $R_3$, $R_4$ and $R_5$ each independently represent a hydrogen atom or an alkyl group having 1 to 4 carbon atoms, and $R_6$, $R_7$ and $R_8$ each independently represent a hydrogen atom, an alkyl group having 1 to 4 carbon atoms or an alkenyl group having 2 to 7 carbon atoms.

2. The non-aqueous electrolytic secondary battery of claim 1, wherein said casing comprises a sheet having a thickness ranging from 0.05 to 0.3 mm.

3. The non-aqueous electrolytic secondary battery of claim 1, wherein said casing comprises a sheet having a thickness ranging from 0.05 to 0.15 mm.

4. The non-aqueous electrolytic secondary battery of claim 1, wherein the positive electrode comprises an active material selected from the group consisting of at least one of lithium cobalt oxide, lithium nickel oxide and lithium manganese complex oxides.

5. The non-aqueous electrolytic secondary battery of claim 1, wherein said non-aqueous solvent contains γ-butyrolactone in an amount of at least 65 to 85% by volume.

6. The non-aqueous electrolytic secondary battery of claim 1, wherein said non-aqueous solvent contains 0.1 to 3% of the vinylene carbonate compound of formula (I) and 0.1 to 3% of the vinylethylene carbonate compound of formula (II) based on the weight of the nonaqueous solvent.

7. The non-aqueous electrolytic secondary battery of claim 1, wherein said non-aqueous solvent contains vinylene carbonate or 4,5-dimethylvinylene carbonate, or both.

8. The non-aqueous electrolytic secondary battery of claim 1, wherein said non-aqueous solvent contains at least one of 4-vinylethylene carbonate, 4-methyl-4-vinylethylene carbonate, or 4,5-divinylethylene carbonate.

9. A non-aqueous electrolytic solution for a secondary battery, which comprises:
at least one non-aqueous solvent and at least one lithium salt dissolved in said solvent which impregnates said electrode group; wherein:
at least 50% of the total volume of the non-aqueous solvent is γ-butyrolactone,
at least 10% of the total volume of the non-aqueous solvent is ethylene carbonate, and
wherein the non-aqueous solvent contains:
0.01 to 5% by weight of at least one vinylene carbonate compound represented by the formula (I),
0.01 to 5% by weight of at least one vinylethylene carbonate compound represented by the formula (II), and
the total amount of the vinylene carbonate compound and the vinylethylene carbonate compound is 0.02 to 6% by weight; wherein formulas (I) and (II) are:

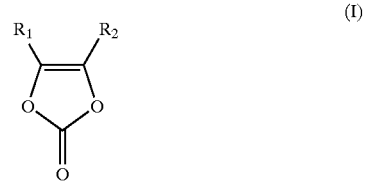

wherein $R_1$ and $R_2$ each independently represent a hydrogen atom or an alkyl group having 1 to 4 carbon atoms, and

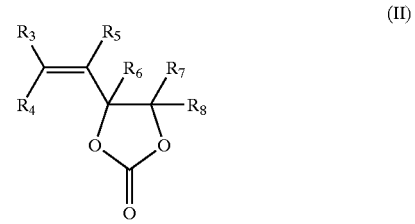

wherein $R_3$, $R_4$ and $R_5$ each independently represent a hydrogen atom or an alkyl group having 1 to 4 carbon atoms, and $R_6$, $R_7$ and $R_8$ each independently represent a hydrogen atom, an alkyl group having 1 to 4 carbon atoms or an alkenyl group having 2 to 7 carbon atoms; and wherein said secondary battery comprises:
a casing comprising a sheet with a thickness of 0.5 mm or less which has a resin layer,
an electrode group having a positive electrode,
a negative electrode which contains a material being capable of storing and releasing lithium ions, and
a separator disposed between the positive electrode and the negative electrode, and said non-aqueous electrolytic solution.

10. The non-aqueous electrolytic solution of claim 9, wherein said non-aqueous solvent contains γ-butyrolactone in an amount of at least 65 to 85% by volume.

11. The non-aqueous electrolytic solution of claim 9, wherein said non-aqueous solvent contains 0.1 to 3% of the vinylene carbonate compound(s) of formula (I), and wherein said compound of formula (I) is vinylene carbonate, or 4,5-dimethylvinylene carbonate, or both.

12. The non-aqueous electrolytic solution of claim 9, wherein said non-aqueous solvent contains 0.1 to 3% of the vinylethylene carbonate compound(s) of formula (II) and,
wherein said compound(s) of formula (II) is selected from the group consisting of 4-vinylethylene carbonate, 4-methyl-4-vinylethylene carbonate, or 4,5-divinylethylene carbonate.

13. The non-aqueous electrolytic solution of claim 9, wherein said non-aqueous solvent contains 0.1 to 3% of the vinylene carbonate compound of formula (I) and 0.1 to 3% of the vinylethylene carbonate compound of formula (II) based on the weight of the nonaqueous solvent.

* * * * *